(12) United States Patent
Schiestl et al.

(10) Patent No.: US 7,922,059 B2
(45) Date of Patent: Apr. 12, 2011

(54) HAND-HELD DRIVE-IN POWER TOOL

(75) Inventors: Ulrich Schiestl, Feldkirch (AT); Walter Odoni, Planken (LI); Tilo Dittrich, Grabs (CH)

(73) Assignee: Hilti Aktiengesellschaft, Schaan (LI)

( * ) Notice: Subject to any disclaimer, the term of this patent is extended or adjusted under 35 U.S.C. 154(b) by 905 days.

(21) Appl. No.: 11/729,186

(22) Filed: Mar. 27, 2007

(65) Prior Publication Data
US 2007/0228101 A1 Oct. 4, 2007

(30) Foreign Application Priority Data

Mar. 28, 2006 (DE) .......................... 10 2006 000 139

(51) Int. Cl.
*B25C 5/02* (2006.01)

(52) U.S. Cl. ........ 227/132; 227/131; 173/118; 173/202; 173/203; 173/120; 173/121; 173/211; 162/161; 162/162; 162/158; 162/164

(58) Field of Classification Search .................. 173/118, 173/202–203, 120–121, 211; 227/131, 132; 267/158, 161, 164, 162
See application file for complete search history.

(56) References Cited

U.S. PATENT DOCUMENTS

| | | | | | |
|---|---|---|---|---|---|
| 3,682,466 | A | * | 8/1972 | Huchette et al. | 267/161 |
| 3,924,692 | A | * | 12/1975 | Saari | 173/117 |
| 3,999,271 | A | * | 12/1976 | Pawloski | 29/752 |
| 4,027,865 | A | * | 6/1977 | Greenwood et al. | 267/148 |
| 4,347,963 | A | * | 9/1982 | Billing | 227/8 |
| 4,427,078 | A | * | 1/1984 | Wolters et al. | 173/126 |
| 4,489,184 | A | * | 12/1984 | Woelfel | 523/466 |
| 5,881,942 | A | * | 3/1999 | Bergamini | 227/132 |
| 5,941,441 | A | * | 8/1999 | Ilagan | 227/131 |
| 5,996,876 | A | * | 12/1999 | Dickhoff et al. | 227/85 |
| 6,708,585 | B1 | | 3/2004 | Rosenauer | |
| 2007/0023472 | A1 | * | 2/2007 | Schiestl | 227/132 |

FOREIGN PATENT DOCUMENTS

| | | |
|---|---|---|
| DE | 0832261 | 1/1952 |
| GB | 0575421 | 2/1946 |

* cited by examiner

*Primary Examiner* — Rinaldi I. Rada
*Assistant Examiner* — Michelle Lopez
(74) *Attorney, Agent, or Firm* — Abelman, Frayne & Schwab

(57) ABSTRACT

A hand-held drive-in power tool for driving-in fastening elements includes a drive-in ram (13) displaceably arranged in a guide (12), a drive (30) for driving the drive-in ram (13) and having at least one driving spring member (31) for displacing the drive-in ram (13) and formed of a fiber-reinforced plastic material, and a device (70) for preloading the driving spring member (31).

4 Claims, 3 Drawing Sheets

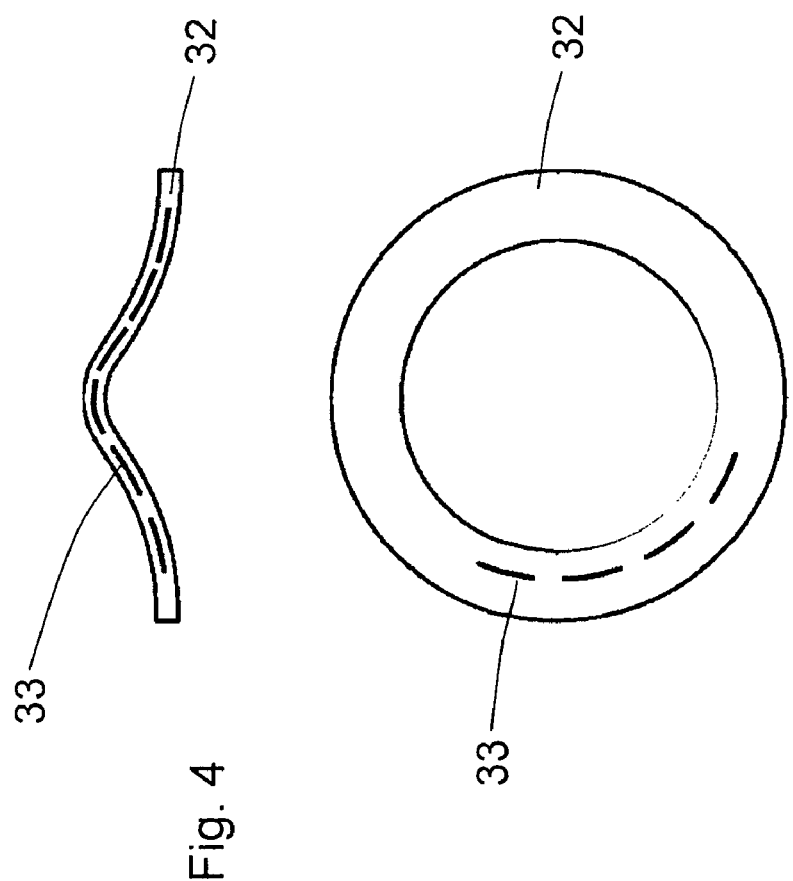

HAND-HELD DRIVE-IN POWER TOOL

BACKGROUND OF THE INVENTION

1. Field of the Invention

The present invention relates to a hand-held drive-in power tool for driving in fastening elements and including a drive-in ram, a guide in which the drive-in ram is displaceably arranged, a drive for driving the drive-in ram and having at least one driving spring member for displacing the drive-in ram, and a device for preloading the driving spring member.

2. Description of the Prior Art

Hand-held drive-in power tools are used for driving fastening elements in constructional components with the drive-in ram. As a drive source for the drive-in ram, a mechanical spring, which is preloaded by a preloading device, is used. The advantage of a driving mechanical spring consists in its cost-effectiveness, so that a drive-in power tool can be economically produced. Further, the advantage of mechanical springs in comparison with the gas springs consists in that preloading of a mechanical spring is not accompanied by increase in temperature as it is the case with a gas spring. Still further, with a preloaded mechanical spring, the stored energy is not lost over a long time, whereas in case of a gas spring, the energy can be completely lost as a result of leakage.

The drawback of mechanical springs in comparison with gas springs consists in that the mechanical springs lose a substantial portion of the energy, which is stored therein, during a rapid expansion because the stored energy is used for acceleration of the spring own mass. Because the mass of a mechanical spring is much greater than that of a gas spring, the corresponding losses in the mechanical springs are much greater in comparison with the gas springs. Because the impact process, which takes place with the drive-in power tools in question, leads to a very rapid expansion of the spring, the above-described phenomenon is very noticeable.

A subject drive-in power tool is disclosed in German patent publication DE 40 13 022 A1. The disclosed drive-in power tool includes an impact mechanism for driving-in nails and which is advanced toward the tool mouth by a spring. An operating device for displacing the impact mechanism in its initial position includes an electric motor and a speed reducing mechanism. The rotary movement of the electric motor is transmitted via the speed reducing mechanism and a cooperating therewith tooth disc to a hammer member of the impact mechanism for displacing the impact mechanism against a spring-biasing force to its initial position in which the impact mechanism is ready for performing an impact process.

The drawback of the known drive-in power tool consists in that the ram speed cannot exceed an amount of 15-20 m/sec which is not sufficient for applications where a high setting energy of about 10-20 J is required, as, e.g., for setting in steel or concrete. This results from the phenomenon, which has already been discussed above, that a mechanical spring must use a portion of energy, which is stored therein, for acceleration of its own mass, which results in the loss of this energy portion for acceleration of the impact mechanism. If order to increase the impact speed of a drive-in power tool, a constructively identical but a stronger spring need be used. Thereby, only own mass of the spring is increased which, again, increases amount of the lost energy, which is used for acceleration of the own mass of the spring, so that, in effect, no increase of speed is achieved.

U.S. Pat. No. 6,708,585 discloses a power tool for driving small nails and having a tubular body in which a ram is displaced. The loop-shaped upper ends of the ram and the body are connected with each other by a rubber band. Before start of a setting process, the ram should be displaced manually relative to the body, tensioning the rubber band. By being released, the ram is displaced in the drive-in direction and drives, with its lower end, a nail in a workpiece.

An object of the invention is a drive-in power tool of the type described above in which the above-mentioned drawbacks of known drive-in power tools are eliminated.

Another object of the invention is a drive-in tool of the type described above in which a high drive-in speed and, simultaneously, a high drive-in energy are achieved with technically simple means.

SUMMARY OF THE INVENTION

These and other objects of the present invention, which will become apparent hereinafter, are achieved by forming the driving spring member of a fiber-reinforced plastic material. Thereby, the mass or the own weight of the driving spring member is noticeably reduced while the stiffness and the module of elasticity of the spring material is noticeably increased at about the same volume and/or weight, which permits to provide a driving spring member for the above-discussed applications and having a spring force that insures the necessary high setting energy. The energy losses, which are associated with the spring mass, can be so reduced that a high drive-in speed of 30-35 m/sec and, simultaneously, a high setting energy during a drive-in process are achieved. In comparison with a drive-in speed of maximum 20 m/sec of a conventional metal coil spring, this represents a noticeable improvement.

Advantageously, the plastic material of the at least one driving spring member contains fibers selected from a group consisting of glass fiber, carbon fibers, aramide fibers, steel fibers and ceramic fibers.

Advantageously, the plastic material is formed as a matrix of at least one of a thermoplastic material and a duroplastic material selected from a group consisting of polyamide, polyetherketone, polyester, polycarbonate, polyester resin, and epoxy resin.

Advantageously, the fibers constitute from 1 to 60% by volume of the plastic material, which makes the advantages of fiber-reinforcement with regard to increase of stiffness particularly pronounced.

It is advantageous when the driving spring member is formed as a coil spring because a coil spring has an ideal geometry for being used in a hand-held tool. A coil spring provides for a large acceleration in the axial direction, and simultaneously, is small and compact in a direction transverse to the axial direction. This insures compactness of the entire construction, which is very important for a hand-held tool.

Advantageously, the driving spring member is formed of a plurality of spring segments. Preferably, separate spring segments are connected with each other at their contact points, e.g., gluing or welding. When the driving spring member is formed as a compression spring, the separate spring segments can be loosely strung together, with the segments being held together by a constantly operating pressure force. In this case, however, the segments should be correspondingly guided in order to insure the stability of the entire construction.

The advantage of forming the driving spring member of a plurality of segments consists is that the spring member can be easily and conveniently produced because separate spring segments have a much simpler geometry than the entire driving spring member, and the manufacture of separate segments is significantly simplified. It is particularly advantageous when all of the spring segments have an identical construction as in this case, the manufacturing can be carried out particularly rationally.

It is further advantageous when the spring segments are formed, e.g., of a flat ring having radially extending, wave-shaped, springy elevations. Thus, separate segments can be produced in a simple manner, e.g., of a plurality of stacked one on top of the other and pressed together layers of fiber material and matrix material or of prepreg mesh.

Naturally, arbitrary other spring segments geometry can be used. The essential limitation with respect to the spring segment geometry consists in that on one hand, stresses, which are produced by the springy movements in the segment in the fibers, the position of which is determined by a selected manufacturing process, must as mush as possible be so taken up that the fibers are subjected primarily to a tensioning load and, on the other hand, the segment geometry must be reproducible by the selected manufacturing process in a simple and rational way. The above-described, wave-shaped geometry of the spring segments meets these requirements as it can be easily produced by pressing. On the other hand, as a result of flattening of wave crests, bending stresses occur in the spring segment and which can easily be absorbed in advantageous manner by fibers extending in compressed layers.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 3 a plan view of a spring segment of the driving spring member according to line III-III in FIG. 2; and FIG. 4 a side view of the spring segment shown in FIG. 3.

DETAILED DESCRIPTION OF THE PREFERRED EMBODIMENT

Figure 1:
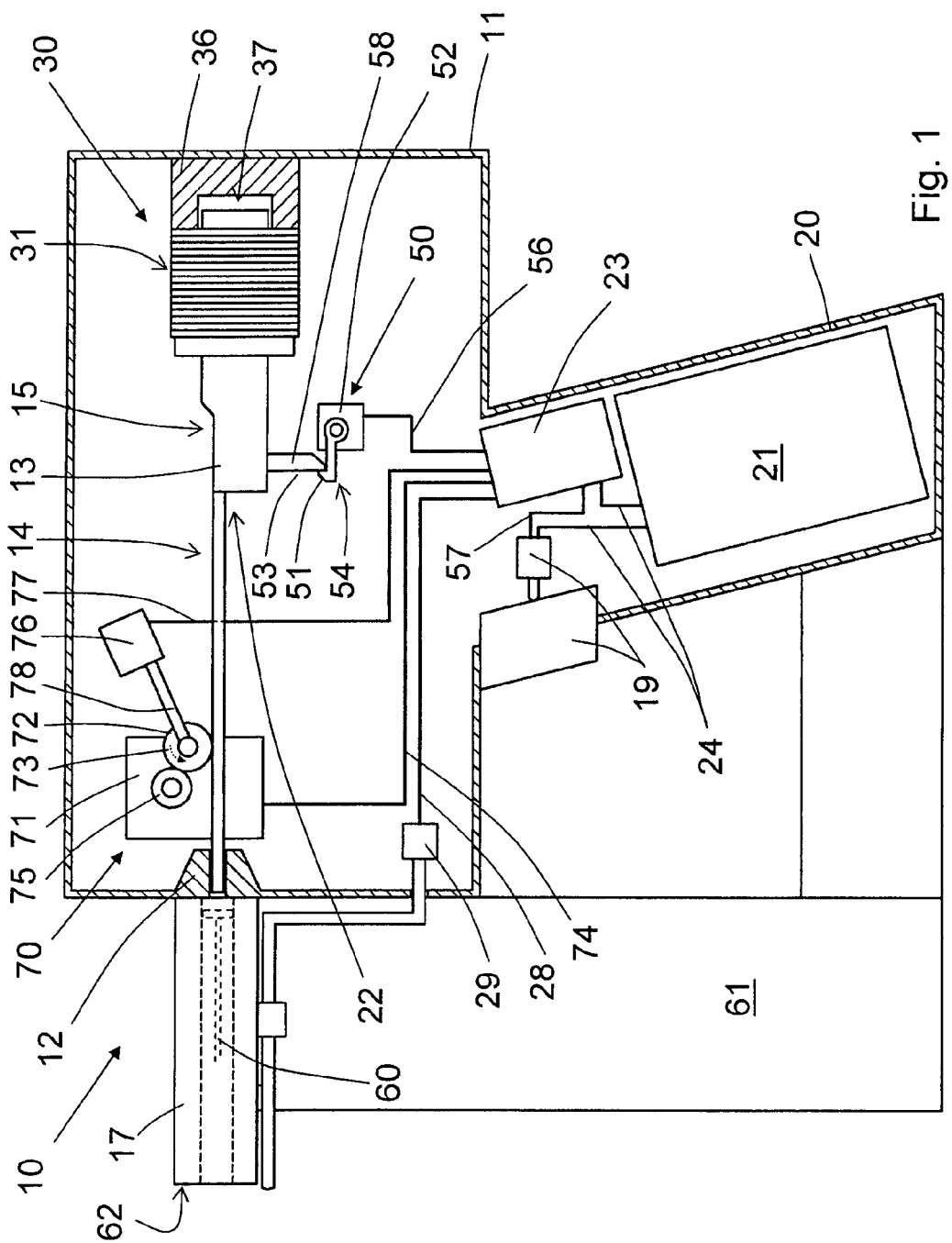
FIG. 1 a longitudinal cross-sectional view of a drive-in power tool according to the present invention.
Figure 2:
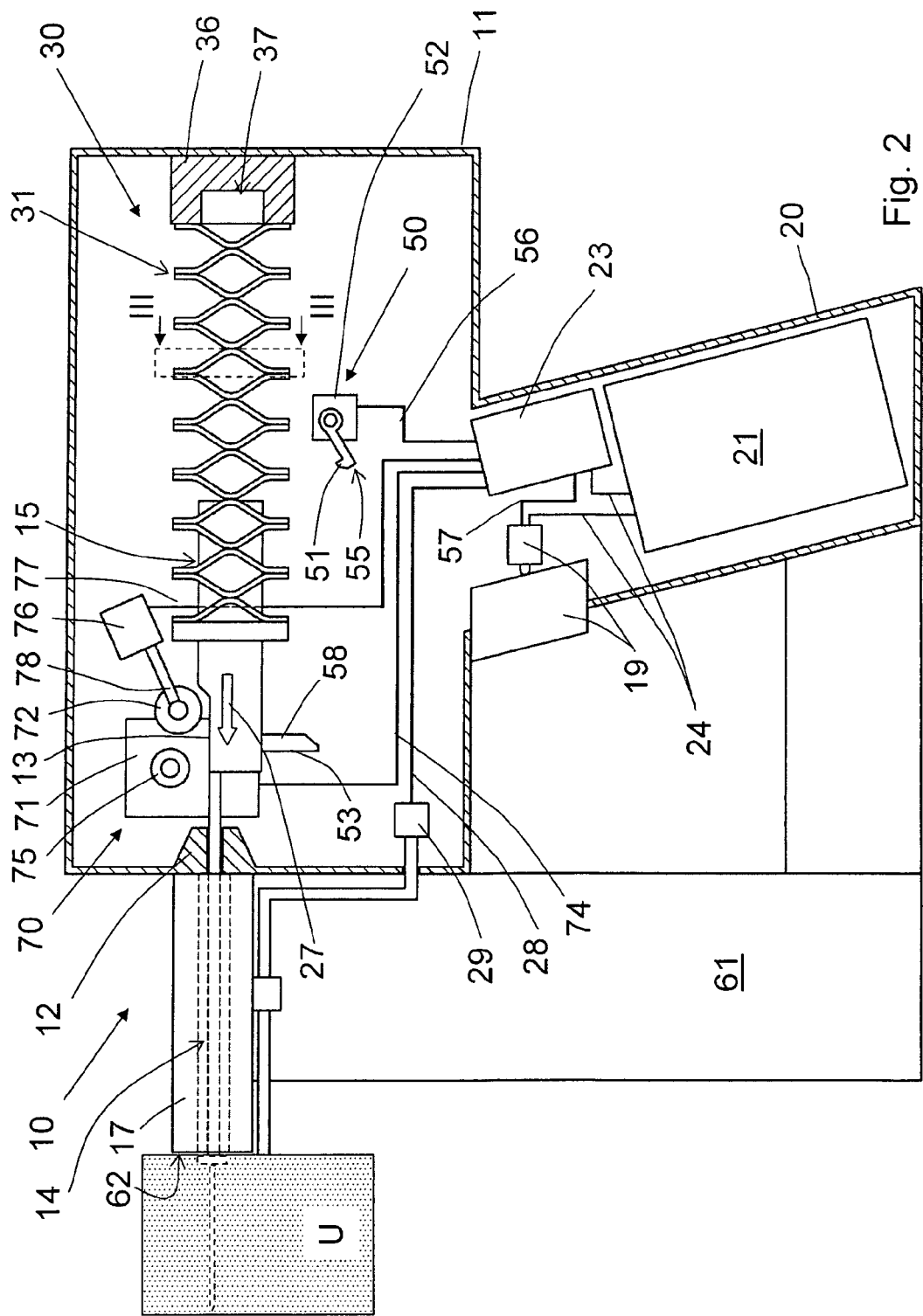
FIG. 2 a longitudinal cross-sectional view of the drive-in power tool shown in FIG. 1 in an actuated position.

A drive-in power tool 10, which is shown in FIGS. 1-2, includes a housing 11 and an arranged therein, drive 30 for driving a drive-in ram 13 displaceable in a guide 12. The drive-in ram 13 has a drive-in section 14 for driving in a fastening element 60 and a head section 15.

A bolt guide 17 adjoins the guide 12 at an end of the guide 12 lying in a drive-in direction 27. Sidewise of the bolt guide 17, projecting therefrom, there is provided a fastening element magazine 61 in which fastening elements 60 are stored.

The drive 30 includes a driving spring member 31 supported at one of its end by a support element 36 indirectly against the housing 11. The other, opposite end of the driving spring member 31 engages the head section 15 of the drive-in ram 13. As particularly shown in FIGS. 2-4, the driving spring member 31 is formed as a composite spring of a plurality of leaf-shaped rounded spring segments 32 made of a fiber-reinforced plastic material. The spring elements can be welded or glued with each other at their contact points. The driving spring member 31 has generally a cylindrical shape. In the expanded condition of the spring member 31 or segments 32 shown in FIGS. 2-4, the separate spring segment 32 have a wave-shaped profile. The plastic material is a thermoplastic or duroplastic material such as, e.g., polyamide, polyetherketone, polyester, polycarbonate or polyester-or epoxy resin in which glass or carbon fibers 33 (as filaments or prepreg mesh) are embedded. However, e.g., ceramic fibers, aramide fibers, or steel fibers can also be embedded. The fibers 33 form of about 1 to 60% by volume, preferably, about from 40% to 60% by volume of the plastic material. In FIG. 3-4, an approximate course of plastic fibers 33 in separate spring segments 32 is shown sectionwise with dash lines. The leaf shape of separate spring segments 32 is advantageous for manufacturing of the driving spring member 31. This is because separate spring segments 32 are produced with a wave shape from a plastic material, e.g., by pressing or stamping. The fiber can be incorporated in the plastic material in a simple way in a stratified form.

In the initial position of the drive-in ram 13 shown in FIG. 1, it is elastically preloaded against driving spring means 31 and is immersed with a free end of its head section in a cylindrical guide chamber 37 defined by the driving spring member 31 and the support element 36. The possibility to place the head section 15 in the guide chamber 37 within these elements and, in particular, within the driving spring member 31, permits to achieve, advantageously, a compact form.

In the initial position 22, the drive-in ram 13 is held with a locking device generally designated with a reference numeral 50. The locking device 50 has a pawl 51 that engages, in a locking position 54 (please see FIG. 1) a locking surface 53 on a projection 58 of the drive-in ram 13, retaining it against the biasing force of the driving spring 31. The pawl 51 is supported on an adjusting motor 52 and is displaced thereby in a release position 55 shown in FIG. 2, as it will be described further below. The adjusting motor 52 is connected with a control unit 23 by a first electrical conductor 56.

The drive-in power tool 10 further has a handle 20 on which there is provided an actuation switch 19 for actuating a drive-in process with the drive-in power tool 10. In the handle 20, there is further provided a power source generally designated with a reference numeral 21 and which supplies the drive-in power tool 10 with the electrical energy. The power source 21 includes at least one accumulator. The power source 21 is connected with the control unit 23 by an electrical supply conductor 24 that also connects the power source 21 with the actuation switch 19. The control unit 23 is connected with the actuation switch 19 by a switch conductor 57.

At the mouth 62 of the drive-in power tool 10, there is provided switching means 29 connected with the control unit 23 by a switching conductor 28. The switching means 29 communicates an electrical signal to the control unit 23 as soon as the drive-in power tool 10 is pressed against a constructional component U, as shown in FIG. 2. This insures that the drive-in power tool 10 can only then be actuated when it is properly pressed against the constructional component U.

The drive-in power tool 10 further includes a preloading device generally designated with a reference numeral 70. The preloading device 70 includes a motor 71 for driving a driven roller 72. The motor 71 is electrically connected with the control unit 23 by a second control conductor 74. The control unit 23 actuates the motor 71, e.g., when the drive-in ram 13 is in its end, in the driving direction 27, position or when the drive-in power tool 10 is lifted off the constructional component U. The motor 71 has driving means 75 such as driving gear connectable with the driven roller 72. The driven roller 72 is rotatably supported on a longitudinally adjustable adjusting arm 78 of an adjusting means 76 formed as a solenoid. The adjusting means 76 is connected with the control unit 23 by an adjusting conductor 77. During an operation, the driven roller 72 rotates in a direction of arrow 73 shown with dash lines.

When the drive-in power tool 10 is actuated by a main switch, not shown, the control unit 23 insures that the drive-in ram 13 is in its initial position 22 shown in FIG. 1. If this is not the case, then, the driven roller 72 of the adjusting means 76 is displaced toward the driving means 75 rotatable by the motor 71 and engages the same. Simultaneously, the driven roller 72 engages the drive-in ram 13 for displacing the same in the direction of arrow 73 in a direction of the drive 30. When the drive-in ram 13 reached its initial position 22, then the pawl 51 of the locking device 50 engages the locking surface 53 on the drive-in ram 13, retaining the drive-in ram 13 in its initial position. Then, the motor 71 can be turned off by the control unit 23, and the adjusting means 76, which is likewise controlled by the control unit 23, displaces the driven roller 72 from its engaging position with the driving means 75 and the drive-in ram 13 to its disengagement position (see FIG. 2).

When the drive-in power tool 10 is pressed against the constructional component U, as shown in FIG. 2, the control unit 23 is moved to its setting-ready condition by the switching means 29. When the actuation switch 19 is actuated by a user, the control unit 23 displaces the locking device 50 into its release position 55 in which the pawl 51 is lifted off the locking surface 53 on the drive-in ram 13 by the servo motor 52. The pawl 51 can be spring-biased in a direction of the drive-in ram 13.

The drive-in ram 13 is then displaced in the drive-in direction 27 by the driving spring member 31 of the drive 30, whereby the fastening element 60 is driven in the constructional component U.

For displacing the drive-in ram 13 back for preloading the driving spring member 31 at the end of the drive-in process, the preloading device 70 is actuated by the control unit 23 when the drive-in power tool 10 is lifted off the constructional component U. To this end, an appropriate signal is communicated to the control unit 23 by switching means 29. The preloading device 70 displaces the drive-in ram 13 against the driving spring member 31 of the drive 30 in a manner described above. Thereby, the driving spring member 31 is preloaded again until the pawl 51 can again occupy its locking position 54 in which it engages the locking surface 53 on the drive in ram 13.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A hand-held drive-in power tool for driving in fastening elements, comprising a drive-in ram (13); a guide (12) in which the drive-in ram (13) is displaceably arranged; a drive (30) for driving the drive-in ram (13) and having at least one driving spring member (31) for displacing the drive-in ram (13) and formed of a plurality of wave-shaped spring segments (32) formed of a fiber-reinforced plastic flat material; and a device (70) for preloading the driving spring member (31).

2. A drive-in power tool according to claim 1, wherein the plastic material of the at least one driving spring member (31) contains fibers selected from a group consisting of glass fibers, carbon fibers, aramide fibers, steel fibers and ceramic fibers.

3. A drive-in power tool according to claim 1, wherein the plastic material of the driving spring member (31) is a matrix of at least one of a thermoplastic material and a duroplastic material selected from a group consisting of a polyamide, polyetherketone, polyester, polycarbonate, polyester resin, and epoxy resin.

4. A drive-in power tool according to claim 1, wherein fibers constitute from 1 to 60% by volume of the plastic material.

* * * * *